United States Patent
Groom et al.

(10) Patent No.: US 8,083,234 B2
(45) Date of Patent: Dec. 27, 2011

(54) SEAL ASSEMBLY

(75) Inventors: Alec R. Groom, Bristol (GB); Gordon S. Margary, Bridgwater (GB)

(73) Assignee: Rolls-Royce plc, London (GB)

( * ) Notice: Subject to any disclaimer, the term of this patent is extended or adjusted under 35 U.S.C. 154(b) by 276 days.

(21) Appl. No.: 12/385,056

(22) Filed: Mar. 30, 2009

(65) Prior Publication Data

US 2009/0283974 A1 Nov. 19, 2009

(30) Foreign Application Priority Data

May 13, 2008 (GB) .................................. 0808561.5

(51) Int. Cl.
*F16J 9/28* (2006.01)
*F16J 15/54* (2006.01)

(52) U.S. Cl. ........................................ 277/345; 277/578

(58) Field of Classification Search .......... 277/579–581, 277/589, 550, 551, 553, 572, 578, 549, 345, 277/464

See application file for complete search history.

(56) References Cited

U.S. PATENT DOCUMENTS

| | | | | | |
|---|---|---|---|---|---|
| 3,001,385 | A | * | 9/1961 | Allen | 464/158 |
| 3,180,650 | A | * | 4/1965 | Liebig | 277/572 |
| 3,926,443 | A | * | 12/1975 | Fenerty et al. | 277/405 |
| 6,012,900 | A | * | 1/2000 | Kennedy et al. | 415/199.2 |
| 6,517,080 | B1 | * | 2/2003 | Pressler | 277/440 |
| 6,912,993 | B2 | * | 7/2005 | Oyamada et al. | 123/337 |
| 6,918,739 | B2 | * | 7/2005 | Addis | 415/1 |
| 7,314,218 | B2 | * | 1/2008 | Hughes | 277/349 |
| 7,438,526 | B2 | * | 10/2008 | Enderby | 415/231 |
| 2001/0022886 | A1 | * | 9/2001 | Cairns et al. | 385/138 |
| 2004/0195778 | A1 | | 10/2004 | Smith et al. | |
| 2007/0257447 | A1 | * | 11/2007 | Petrak | 277/551 |
| 2009/0051120 | A1 | * | 2/2009 | Munsell et al. | 277/400 |
| 2009/0146379 | A1 | * | 6/2009 | Foster et al. | 277/307 |
| 2009/0283974 | A1 | * | 11/2009 | Groom et al. | 277/572 |
| 2010/0237565 | A1 | * | 9/2010 | Foster | 277/377 |

FOREIGN PATENT DOCUMENTS

| | | |
|---|---|---|
| GB | 2 027 818 A | 2/1980 |
| GB | 2 345 520 A | 7/2000 |
| WO | WO 91/03626 | 3/1991 |
| WO | WO 99/53226 A1 | 10/1999 |

OTHER PUBLICATIONS

May 6, 2010 Great Britain Office Action for Application No. GB0808561.5.

* cited by examiner

*Primary Examiner* — Thomas Beach
*Assistant Examiner* — Kelly Shaw
(74) *Attorney, Agent, or Firm* — Oliff & Berridge, PLC

(57) ABSTRACT

Seal assembly for sealing a clearance gap between a boundary of an aperture formed in a housing and a member extending through the aperture. The seal assembly comprises a seal member and a seal member mounting means disposed around the sealing member and is configured to engage with the aperture boundary. The seal member mounting means is configured to seal an alignment interspace provided in the clearance gap between the seal member and aperture boundary. The seal member mounting means is configurable to permit the seal member to be located at a position relative to the aperture boundary in dependence upon the relative positions of the member and aperture boundary to thereby accommodate misalignment between the member and aperture boundary. The seal member mounting means is configurable to lock the seal member relative to the aperture boundary in said position.

16 Claims, 3 Drawing Sheets

SEAL ASSEMBLY

FIELD OF INVENTION

The present invention relates to a seal assembly.

In particular the invention is concerned with a seal assembly comprising a seal member and a seal mounting means for sealing a clearance gap between a boundary of an aperture formed in a housing and a member extending through the aperture.

BACKGROUND OF THE INVENTION

With reference to FIG. 1 (PRIOR ART) and FIG. 2 (PRIOR ART), it is often necessary to seal a clearance gap (identified as "A") between a housing 10 and a member 12 (ie a component) extending through an aperture 14 in the housing 10. For example, it is necessary to seal between a casing for a gear box and a power off take shaft which extends from inside the gearbox through an aperture in a wall of the casing such that another component can be coupled to the shaft. In a further example, it is necessary to seal between a machine housing and a duct which are moveable relative to one another (eg flex or relative longitudinal movement), where the duct extends from inside the housing through an aperture in a wall of the housing to form a fluid communication with a unit outside of the housing 10. FIG. 1 shows a two part housing in a disassembled state. A lid part 10b locates on a main body part 10a to form an enclosed housing 10, as shown in FIG. 2. The lid 10b and body 10a are joined by some suitable method at a flanges 18a, 18b provided on both parts 10a, 10b. The shaft extends from within the main body 10a of the housing 10, the details of which are not relevant to the present invention. A seal may be achieved by placing a seal member 16 between the component 12 and the aperture 14 wall to fill the clearance gap "A" between them. Any misalignment between the housing 10 and seal member 16 due to manufacture and assembly must be accommodated by the seal member 16. Failure to do so will result in reaction forces being set up between the housing 10 and component 12. Such forces will be transmitted through the seal member 16, which will cause increased wear on the seal member 16 and thus reduce its operationally effective life. Hence the clearance between the seal member 16 and the component 12 may need to be overly large (ie non optimal) to ensure the component 12 can extend freely through the aperture 14 without radially loading the seal member 16. However, to ensure optimal seal performance, there should be minimal clearance between the seal member 16 and component 12, as shown in FIG. 1 and FIG. 2.

To minimise the clearance gap "A" it is necessary to manufacture the constituent parts of the housing 10 and component 12 with very tight tolerances to ensure that misalignment between the components is minimal, and that the aperture 14 is of an acceptable size. For example, the distance between the axis of the shaft 12 and the casing 10a 10b, the aperture 14 and outer diameter of seal 16 (marked as B, C, D and E respectively in FIGS. 1 and 2) must be closely controlled. This often requires slow and/or expensive manufacturing methods, and increases the possibility of scrap and non-conformance. Additionally, current seal assembly designs contain a large number of dimensions that require tightly toleranced components, which are difficult, and hence expensive, to manufacture.

It is an object of the present invention to provide a seal assembly which can seal a clearance gap between a housing and a component extending through an aperture in the housing which can accommodate larger misalignments of the component and housing than the prior art.

SUMMARY OF THE INVENTION

According to a first aspect of the present invention, there is provided a seal assembly for sealing a clearance gap between a boundary of an aperture formed in a housing and a member extending through the aperture, the seal assembly comprising a seal member and a seal member mounting means disposed around the sealing member and configured to engage with the aperture boundary, characterised in that the seal member mounting means is configured to seal an alignment interspace provided in the clearance gap between the seal member and aperture boundary, and the seal member mounting means is configurable to permit the seal member to be located at a position relative to the aperture boundary in dependence upon the relative positions of the member and aperture boundary to thereby accommodate misalignment between the member and aperture boundary, and the seal member mounting means is configurable to lock the seal member relative to the aperture boundary in said position.

The present invention thus provides a seal member mounted on a seal member mounting means which allows the seal member to take up a position which is dependent upon relative position of the aperture boundary and member. That is to say, the seal member mounting means is adjustable to permit relative movement between the seal member and aperture boundary to accommodate misalignments and large tolerances in the assembly of the housing and the member. Thus the clearance between the seal member and the member can be minimal to thus ensure optimal sealing between them. Since the present invention enables improved alignment of the seal and aperture, forces on the seal member due to misalignment of the seal member and aperture will be reduced compared to the arrangement of the prior art.

According to a second aspect of the present invention, there is provided a method of assembling apparatus comprising the steps of:

a) assembling the member, housing, a seal member and seal member mounting means such that the seal member is located on the housing by the seal member mounting means, and is disposed between the member and aperture boundary in a position defined by the relative positions of the member and aperture boundary;

b) configuring the seal member mounting means to lock the seal member relative to the aperture boundary.

Thus the invention provides a method which can accommodate misalignments and large tolerances in the assembly of the housing and the member. Thus the clearance between the seal member and the member can be minimal to thus ensure optimal sealing between them.

BRIEF DESCRIPTION OF THE DRAWINGS

Embodiments of the invention will now be described with reference to the accompanying drawings, in which.

DETAILED DESCRIPTION OF EMBODIMENTS

Figure 1:
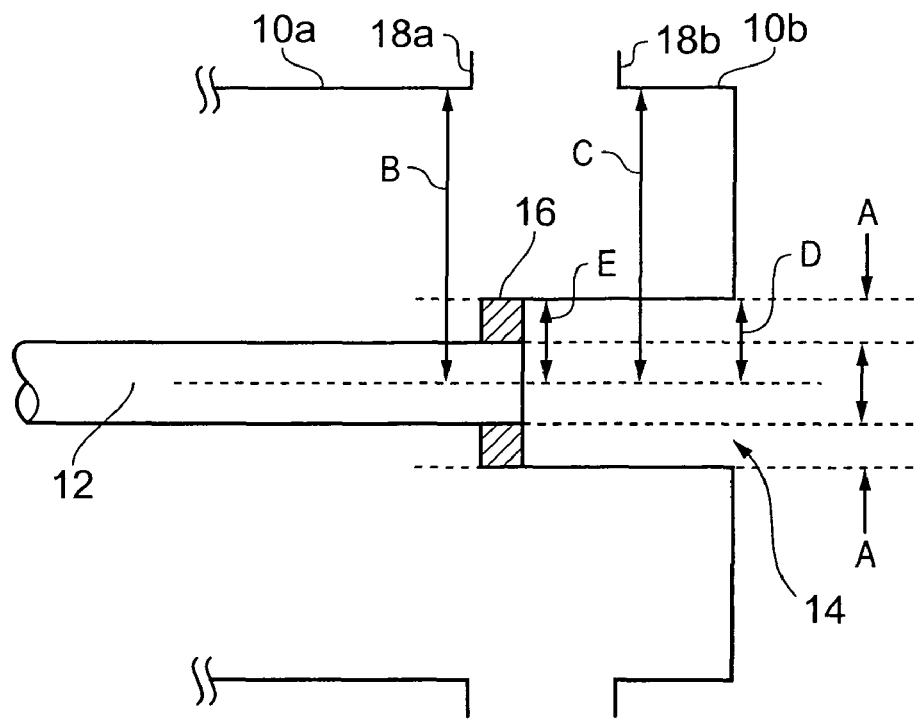
FIG. 1 (PRIOR ART) shows a shaft housing in a disassembled state, with a known seal assembly.
Figure 2:
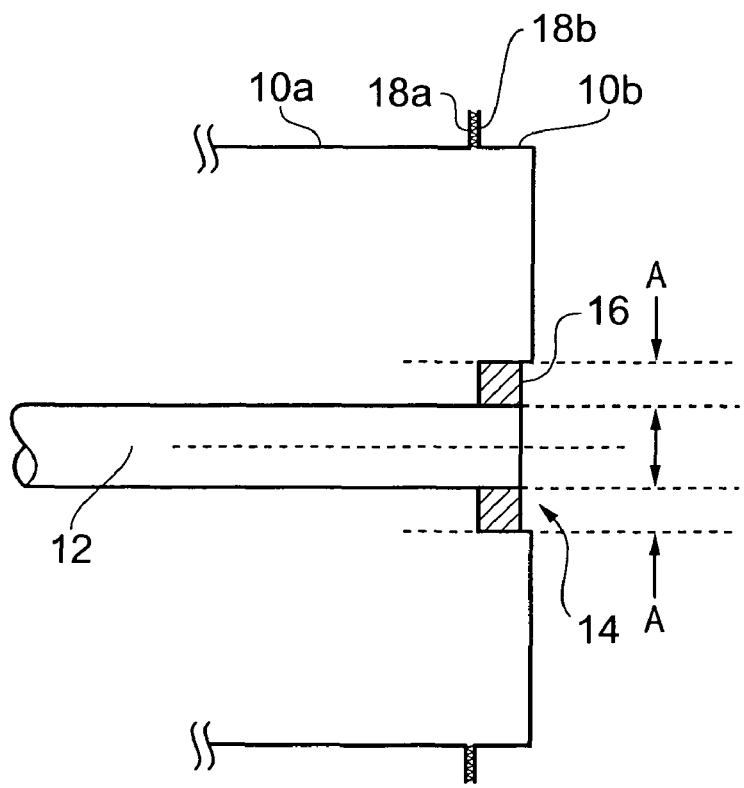
FIG. 2 (PRIOR ART) shows the shaft housing of FIG. 1 in an assembled state.
Figure 3:
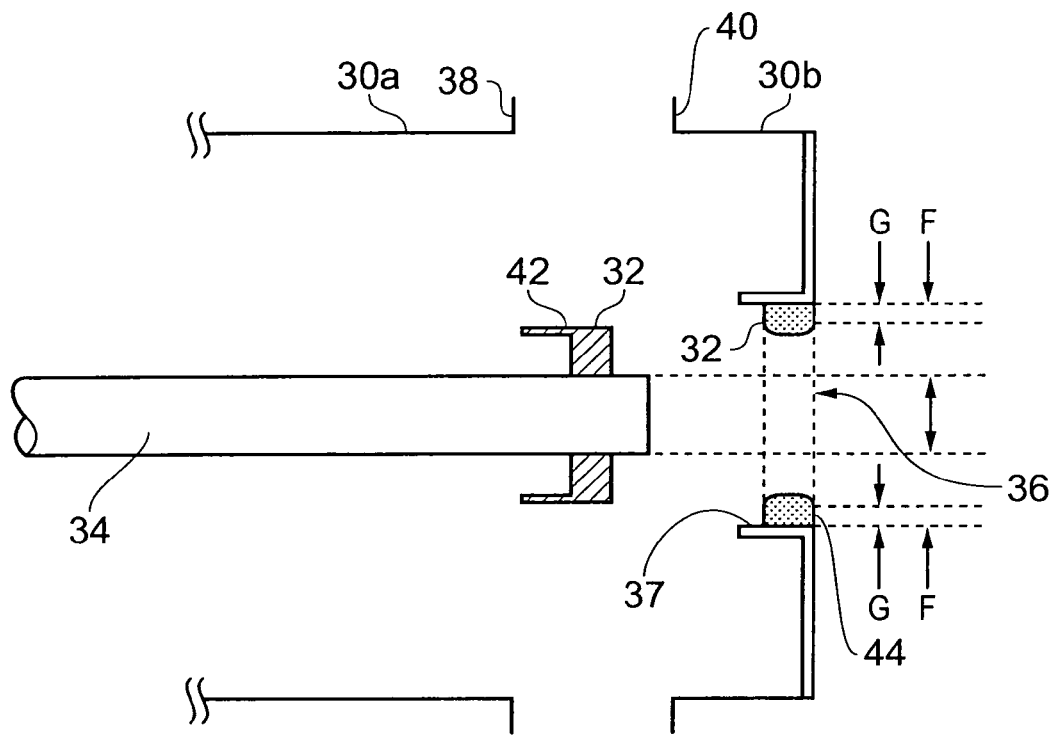
FIG. 3 shows a shaft housing with a sealing assembly comprising a seal member and malleable fixative seal member mounting means according to one embodiment of the present invention, with the shaft housing in a in a disassembled state.
Figure 4:
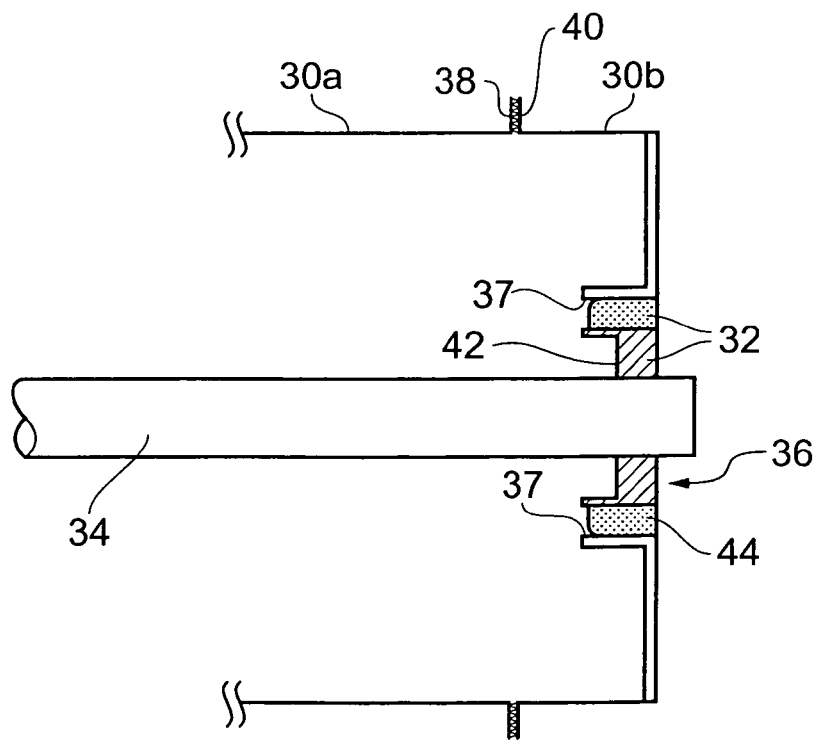
FIG. 4 shows the shaft housing of FIG. 3 in an assembled state.

FIG. 3 shows a housing 30 with a sealing assembly 32 according to the present invention, in which the housing 30 and sealing assembly 32 is shown in a disassembled state. FIG. 4 shows the same housing 30 and sealing assembly 32 in an assembled state. The housing comprises a main body part 30a and a lid part 30b. An aperture 36 is provided in the lid part 30b. A member 34 extends from within the housing 30 and, in the assembled state, extends towards and through the aperture 36 with a clearance gap F between the inner radius, or boundary 37, of the aperture 36 and member 34. Flanges 38,40 are provided on the body 30a and lid 30b parts respectively, for joining the housing parts 30a, 30b together. The sealing assembly 32 comprises a seal member 42 provided on the end of the member 34 and a seal member mounting means 44 provided in the aperture 36. Alternatively the sealing member mounting means 44 could be provided around the perimeter of the seal member 42. The seal member mounting means 44 is configured to engage with the boundary of the aperture 36. The precise configuration of the seal member 42 is not relevant to the present invention. Suffice it to say that the seal member 42 is configured to allow the member 34 to translate and/or rotate relative to the seal member 42.

The clearance F is substantially larger than can be spanned by the seal member 42, and comprises an alignment interspace G defined by the gap between the outer diameter of the seal member 42 and the boundary 37 of the aperture 36. The alignment interspace G is sized to allow the member 34 to easily pass through the aperture 36, such that large misalignments between the member 34 and housing 30 can be accommodated. The seal member mounting means 44 is configurable to permit the seal member 42 to be located at a position in the plane of the aperture 36 in dependence upon the relative positions of the member 34 and aperture boundary 37. That is to say, the seal member mounting means 44 in combination with the seal member 42 provides a seal between the member 34 and boundary of the aperture 36 whether or not the member 34 is concentric with the aperture 36. In one embodiment the seal member mounting means 44 is configurable to seal an alignment interspace G that has a span of at least 1% of the outer diameter of the seal member 42 but no greater than 10% of the outer diameter of the seal member 42.

The seal member mounting means 44 is a curable malleable fixative. That is to say, it is deformable to permit relative movement of the seal member 42 and aperture boundary 37 in the plane of the aperture 36 during assembly. Thus the seal member 42, which is carried on the member 34, may take up any position within the boundary 37 defined by the aperture 36. Hence misalignment between the member 34 and housing 30 is accommodated during assembly. The curable malleable fixative is configured to solidify and bond to the aperture boundary 37 and sealing member 42, thereby locking the seal member 42 relative to the aperture boundary 37. The curable malleable fixative is chosen from a list of materials comprising polyaryletheretherketone (PEEK), epoxy resin and curable ceramics. The malleable fixative may additionally comprise re-inforcement fibres, for example glass fibres or carbon fibres.

During the assembly process the lid part 30b is attached to the body part 30a so that member 34 extends out of the aperture 36. The seal member mounting means 44 is provided in sufficient quantity around the seal member 42 and/or aperture boundary 37 so that it is deformed when the seal member 42 is entered in the aperture 36. The member 34 is free to take up a position relative to the aperture 36 since the seal member mounting means will deform around the seal member 42 carried on the member 34. That is to say the seal member 42 is located on the housing 30 by the seal member mounting means 44, and is disposed between the member 34 and aperture boundary 37 in a position defined by the relative positions of the member 34 and aperture boundary 37. When in a final position, the seal member mounting means 44 is cured so as to harden and bond the seal member 42 to the aperture boundary 37. Additionally the seal member mounting means will act as a barrier to seal the alignment interspace G.

Figure 5:
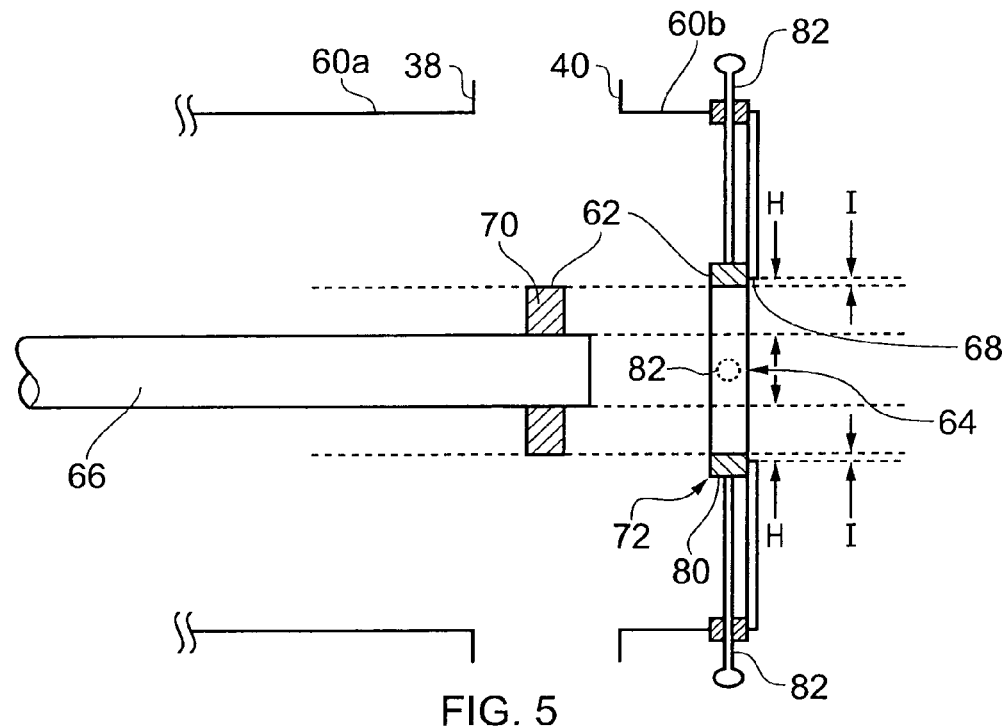
FIG. 5 shows a shaft housing with a sealing assembly comprising a seal member and sealing land fixture according to one embodiment of the present invention, with the shaft housing in a in a disassembled state.
Figure 6:
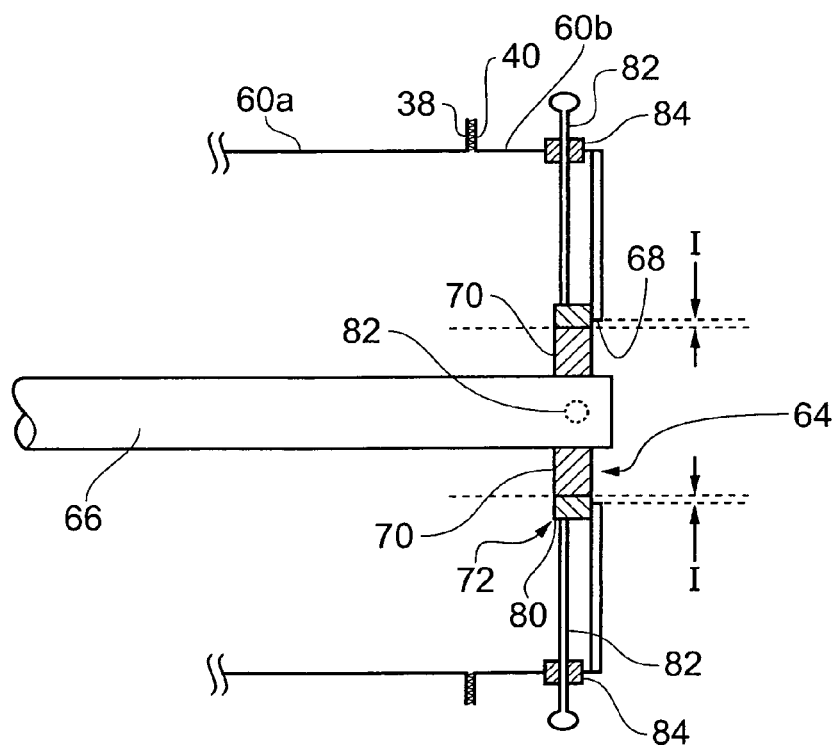
FIG. 6 shows the shaft housing of FIG. 5 in an assembled state.

FIG. 5 shows a housing 60 with an alternative sealing assembly 62 according to the present invention, in which the housing 60 and sealing assembly 62 is shown in a disassembled state. FIG. 6 shows the same housing 60 and sealing assembly 62 in an assembled state. The housing comprises a main body part 60a and a lid part 60b. An aperture 64 is provided in the lid part 60b. A member 66 extends from within the housing 60 and, in the assembled state, extends towards and through the aperture 64 with a clearance gap H between the inner radius, or boundary 68, of the aperture 64 and member 66. The sealing assembly 62 comprises a seal member 70 provided on the end of the member 66 and a seal member mounting means 72 provided at the aperture 64. Alternatively the sealing member mounting means 72 could be provided around the perimeter of the seal member 70. In the example shown, the seal member mounting means 72 engages with the wall around the periphery, or boundary, of lid part 60b which defines the aperture 64. That is to say, the seal member mounting means 72 is configured to seal against the perimeter, or boundary 68, of the aperture 64. The precise configuration of the seal member 70 is not relevant to the present invention. Suffice it to say that the seal member 70 is configured to allow the member 66 to translate and/or rotate relative to the seal member 70.

The clearance H is substantially larger than can be spanned by the seal member 70, and comprises an alignment interspace "I" defined by the gap between the outer diameter of the seal member 70 and the boundary 68 of the aperture 64. The alignment interspace I is sized to allow the member 66 to easily pass through the aperture 64, such that large misalignments between the member 66 and housing 60 can be accommodated. The seal member mounting means 72 is configurable to permit the seal member 70 to be located at a position in the plane of the aperture 46 in dependence upon the relative positions of the member 66 and aperture boundary 68. That is to say, the seal member mounting means 72 in combination with the seal member 70 provides a seal between the member 66 and boundary 68 of the aperture 64 whether or not the member 66 is concentric with the aperture 64. In one embodiment the seal member mounting means 72 is configurable to seal an alignment interspace I that has a span of at least 1% of the outer diameter of the seal member 42 but no greater than 10% of the outer diameter of the seal member 70.

In the embodiment shown in FIG. 5 and FIG. 6 the seal member mounting means 72 comprises a sealing land fixture 80 adjustably mounted on the housing lid part 60b. When assembled the sealing land fixture 80 is disposed around the seal member 70 and seals against the aperture boundary 68. Additionally the sealing land fixture 80 is adjustably mounted on the housing lid part 60b by a plurality of adjustment rods 82. Each of the rods 82 extends through a passage in a boss 84 on the wall of the lid part 60b. Complementary threads are provided on the rods 82 and bosses 84 such that rotation of each rod 82 will adjust the relative position of the sealing land fixture 80 and relative to the aperture boundary 68. The screw threads may be locked to lock the sealing land fixture 80, and, when assembled, the seal member 70, relative to the aperture boundary 68.

Both the main body part 30a,60a and lid part 30b,60b are provided with location features, for example the flanges 38,40, the mounting features member 34 (not shown) and the mounting features for the main body part 30a,60a, each have a manufacturing tolerance which define the limits within which the finished parts be made, and thus which define their position relative to one another when assembled. The alignment interspace G, I is at least 60%, but no greater than 120%, of the sum of the manufacturing tolerances of the location features, and the seal member mounting means 44,72 are configurable to seal said alignment interspace G, l.

In the embodiments shown, the member 34,66 may be a hollow conduit for the passage of fluid. Additionally, or alternatively, the member 34,36 may be a rotatable shaft.

Thus a sealing assembly is provided in which a seal member can be located in a low tolerance support structure as it is assembled, and then locked in position. Oversized apertures 36,64 can be provided to allow for small or large misalignments between a member 34,66 and the housing 30,60 which defines the aperture 36,64. The adjustable nature of the seal member mounting means 44, 72 is such to allow the seal member 42,70 to find its preferred location within the aperture 36,64 without the need for tight tolerances being adhered to in the construction of the housing structure. Hence build tolerances for the housing 30,60 and member 34,66 can be larger, which results in an assembly which is easier to manufacture and assemble.

The invention claimed is:

1. An apparatus comprising:
   a housing with an aperture;
   a member that extends through said aperture;
   a seal assembly for sealing a clearance gap between an aperture boundary and the member, the seal assembly comprising a seal member and a seal member mounting means disposed around the seal member and configured to engage with the aperture boundary; and
   at least two joined parts, the aperture being provided in one of said parts, wherein:
   the seal member mounting means is configured to seal an alignment interspace provided in the clearance gap between the seal member and the aperture boundary,
   the seal member mounting means is configurable to permit the seal member to be located at a position relative to the aperture boundary in dependence upon the relative positions of the member and aperture boundary to thereby accommodate misalignment between the member and aperture boundary,
   the seal member mounting means is configurable to rigidly lock the seal member relative to the aperture boundary in said position;
   the clearance gap comprises an alignment interspace to permit the seal member to be located at a position in the plane of the aperture in dependence upon the relative positions of the member and aperture boundary;
   each of the at least two joined parts is provided with location features which each have a manufacturing tolerance; and
   the alignment interspace is at least 60% of the sum of the manufacturing tolerances of the location features but not greater than 120% of the sum of the manufacturing tolerances.

2. The apparatus as claimed in claim 1 wherein the seal member mounting means is configurable to seal an alignment interspace that has a span of at least 1% of the outer diameter of the seal member but no greater than 10% of the outer diameter of the seal member.

3. The apparatus as claimed in claim 1 wherein the seal member mounting means is a curable malleable fixative configured to permit relative movement of the sealing member and aperture boundary during assembly of the sealing member relative to the aperture.

4. The apparatus as claimed in claim 3 wherein the curable malleable fixative is configured to solidify and bond to the aperture boundary and sealing member, thereby locking the seal member relative to the aperture boundary.

5. The apparatus as claimed in claim 3 wherein the curable malleable fixative is selected from the group of materials consisting of polyaryletheretherketone (PEEK), epoxy resin and curable ceramics.

6. The apparatus as claimed in claim 1 wherein the seal member mounting means comprises a sealing land fixture adjustably mounted on the housing and disposed between the aperture boundary and the seal member.

7. The apparatus as claimed in claim 6 wherein the sealing land fixture is mounted on the housing by a plurality of adjustment rods which are adjustable to alter the relative position of the sealing land fixture and aperture boundary.

8. The apparatus as claimed in claim 7 wherein the adjustment rods are lockable to lock the seal member relative to the aperture boundary.

9. The apparatus as claimed in claim 8 wherein the adjustment rods are threaded bolts for engagement with threaded passages provided in the housing.

10. The apparatus as claimed in claim 1 wherein the alignment interspace has a span which is at least 1% of the outer diameter of the seal member but no greater than 10% of the outer diameter of the seal member.

11. The apparatus as claimed in claim 1 wherein the member is a hollow conduit.

12. The apparatus as claimed in claim 1 wherein the member is a rotatable shaft.

13. A method of assembling the apparatus as claimed in claim 1 comprising the steps of:
   a) assembling the member, housing, a seal member and seal member mounting means such that the seal member is located on the housing by the seal member mounting means, and is disposed between the member and aperture boundary in a position defined by the relative positions of the member and aperture boundary;
   b) configuring the seal member mounting means to rigidly lock the seal member relative to the aperture boundary.

14. A seal assembly for sealing a clearance gap between a boundary of an aperture formed in a housing and a member extending through the aperture,
   the seal assembly comprising a seal member and a seal member mounting means disposed around the sealing member and configured to engage with the aperture boundary,
   wherein the seal member mounting means is configured to seal an alignment interspace provided in the clearance gap between the seal member and aperture boundary, the seal member mounting means is configurable to permit the seal member to be located at a position relative to the aperture boundary in dependence upon the relative positions of the member and aperture boundary to thereby accommodate misalignment between the member and aperture boundary, the seal member mounting means is configurable to rigidly lock the seal member relative to the aperture boundary in said position, the seal member mounting means comprises a sealing land fixture adjustably mounted on the housing and disposed between the aperture boundary and the seal member, and the sealing land fixture is mounted on the housing by a plurality of adjustment rods which are adjustable to alter the relative position of the sealing land fixture and aperture boundary.

15. The seal assembly as claimed in claim 14 wherein the adjustment rods are lockable to lock the seal member relative to the aperture boundary.

16. The seal assembly as claimed in claim 14 wherein the adjustment rods are threaded bolts for engagement with threaded passages provided in the housing.

* * * * *